(12) United States Patent
Hua

(10) Patent No.: US 7,139,179 B2
(45) Date of Patent: Nov. 21, 2006

(54) SWITCHING MODE POWER CONVERTER HAVING SECONDARY SIDE BIAS GENERATING AND DRIVING CIRCUIT TO PROVIDE SYNCHRONOUS RECTIFICATION AND ACTIVE CLAMP

(75) Inventor: Lei Hua, Camarillo, CA (US)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 11/118,703

(22) Filed: Apr. 29, 2005

(65) Prior Publication Data

US 2006/0018133 A1    Jan. 26, 2006

Related U.S. Application Data

(60) Provisional application No. 60/566,253, filed on Apr. 29, 2004.

(51) Int. Cl.
*H02M 5/42* (2006.01)
*H02M 3/335* (2006.01)
(52) U.S. Cl. .................. 363/89; 363/127; 363/91; 363/21.06
(58) Field of Classification Search .............. 363/89, 363/91, 127, 21.06
See application file for complete search history.

(56) References Cited

U.S. PATENT DOCUMENTS 6,504,735 B1 *   1/2003   Negru et al. .................. 363/97

* cited by examiner

*Primary Examiner*—Shawn Riley
(74) *Attorney, Agent, or Firm*—O'Melveny & Myers LLP

(57) ABSTRACT

A switched mode power converter includes a transformer having a primary winding, a secondary winding, and a bias winding. A primary side power switch is coupled to the primary winding and is adapted to periodically apply an input voltage to the primary winding. An output filter is operatively coupled to the secondary winding to provide an output voltage and output current. A forward synchronous rectification device is operatively coupled in series between the secondary winding and the output filter. A free-wheeling synchronous rectification device is operatively coupled in shunt with the secondary winding and the output filter. A control circuit is coupled to the bias winding and the forward and free-wheeling synchronous rectification devices. The control circuit includes a forward driving device adapted to couple an activation terminal of the forward synchronous rectification device to a first end of the secondary winding and a free-wheeling driving device adapted to couple an activation terminal of the free-wheeling synchronous rectification device to a second end of the secondary winding. The control circuit activates the forward and free-wheeling driving devices responsive to voltage on the bias winding.

16 Claims, 4 Drawing Sheets

SWITCHING MODE POWER CONVERTER HAVING SECONDARY SIDE BIAS GENERATING AND DRIVING CIRCUIT TO PROVIDE SYNCHRONOUS RECTIFICATION AND ACTIVE CLAMP

RELATED APPLICATION DATA

This application claims priority pursuant to 35 U.S.C. § 119(e) to provisional patent application Ser. No. 60/566,253, filed on Apr. 29, 2004.

BACKGROUND OF THE INVENTION

1. Field of the Invention

The present invention relates to switching mode power converter circuits. More particularly, the invention relates to single-ended, isolated switching mode power supplies that utilize secondary side, self-driven synchronous rectification.

2. Description of Related Art

Switching mode DC-to-DC power converters are commonly used in the electronics industry to convert an available direct current (DC) level voltage to another DC level voltage. A switching mode converter provides a regulated DC output voltage to a load by selectively storing energy in an output inductor coupled to the load by switching the flow of current into the output inductor. An isolated forward converter is a particular type of switching mode converter in which an input DC voltage is periodically switched across the primary side of a transformer using one or more power switches, typically provided by MOSFET devices. The transformer provides isolation between the voltage source on the primary side and a load on the secondary side. Two diodes on the secondary side rectify the switched and isolated input voltage, including a forward diode connected in series with secondary winding that conducts current to the load when the input voltage is present across the secondary winding and a free-wheeling diode connected in shunt with the secondary winding that conducts current to the load when the input voltage is not present across the secondary winding.

In order to improve the efficiency of the forward converter circuits, it is known to replace the rectifying diodes with power switches (e.g., MOSFET devices). The operation of the power switches may be controlled so that they are turned on and off in synchronism with the switched input voltage. The control signals applied to the power switches must be synchronized as closely as possible to the current inflection points of the output inductor. This synchronous rectification provides higher efficiency over the foregoing forward converter configuration since the forward voltage drop of the power switches is much lower than that of diodes.

So-called active-clamp forward synchronous rectification topologies are very popular in the telecommunication power business. The topology could be found in the power applications ranging from 50 W to 300 W. Power systems for telecommunications applications must satisfy certain considerations with respect to size and protection of the secondary side synchronous rectification MOSFETs. Isolated telecommunication power modules are typically designed to achieve a minimum size. Thus, a simple circuit is usually preferred over a more complex circuit.

Nevertheless, this simplicity of the power converter circuit is difficult to achieve. In an isolated power converter topology, it is necessary to provide bias voltage to the synchronous rectifying MOSFETs. This bias voltage is often provided by a peak charging circuit that is coupled to an additional secondary winding of the transformer, which tends to increase the size and complexity of the transformer winding structure. In addition to the bias circuitry, it is known to control the power switches using a self-driven topology in which the gates of the synchronous rectifying MOSFETs are coupled to the ends of the power transformer secondary winding. The MOSFETs are therefore activated synchronously with the changing voltage across the secondary winding. A drawback with the self-driven topology is that the operation of the power switches can not be controlled to regulate the output voltage of the power converter. Moreover, the voltage applied to the gates of the MOSFETs from the secondary winding may damage the MOSFETs. In view of these drawbacks with self-driven topology, a controlled-driven topology is known in which a separate control circuit is used to detect the current inflection points and activate the MOSFETs. But, a drawback of the controlled-driven topology is that the control circuit increases the complexity and cost of the power converter. Since it is desirable to reduce the size of power converter modules, such as for telecommunications applications, the increased complexity of the power converter due to the bias circuitry as well as the MOSFET control circuit represent significant impediments to providing a simple module structure.

Accordingly, it would be desirable to provide an isolated forward converter power module with synchronous rectifier control and bias circuitry that overcomes these drawbacks of the prior art.

SUMMARY OF THE INVENTION

The present invention provides a switched mode power converter having synchronous rectifier controls and bias circuitry while maintaining a generally simple control structure.

In an embodiment of the invention, a switched mode power converter includes a transformer having a primary winding, a secondary winding, and a bias winding. A primary side power switch is coupled to the primary winding and is adapted to periodically apply an input voltage to the primary winding. An output filter is operatively coupled to the secondary winding to provide an output voltage and output current. A forward synchronous rectification device is operatively coupled in series between the secondary winding and the output filter. A free-wheeling synchronous rectification device is operatively coupled in shunt with the secondary winding and the output filter. A control circuit is coupled to the bias winding and the forward and free-wheeling synchronous rectification devices. The control circuit includes a forward driving device adapted to couple an activation terminal of the forward synchronous rectification device to a first end of the secondary winding and a free-wheeling driving device adapted to couple an activation terminal of the free-wheeling synchronous rectification device to a second end of the secondary winding. The control circuit activates the forward and free-wheeling driving devices responsive to voltage on the bias winding.

A more complete understanding of the switched mode power converter having synchronous rectifier controls and bias circuitry will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 4 is a simplified schematic diagram of a charging path of the bias circuitry when the primary side power switch is turned on;

FIG. 6 is a simplified schematic diagram of a driving path of the forward converter when the forward synchronous rectification device is turned on;

FIG. 8 is a simplified schematic diagram of a driving path of the forward converter when the free-wheeling synchronous rectification device is turned on.

DETAILED DESCRIPTION OF THE PREFERRED EMBODIMENT

The present invention satisfies the need for an isolated forward converter power module with synchronous rectifier control and bias circuitry. In the detailed description that follows, like element numerals are used to describe like elements illustrated in one or more of the figures.

Figure 1:
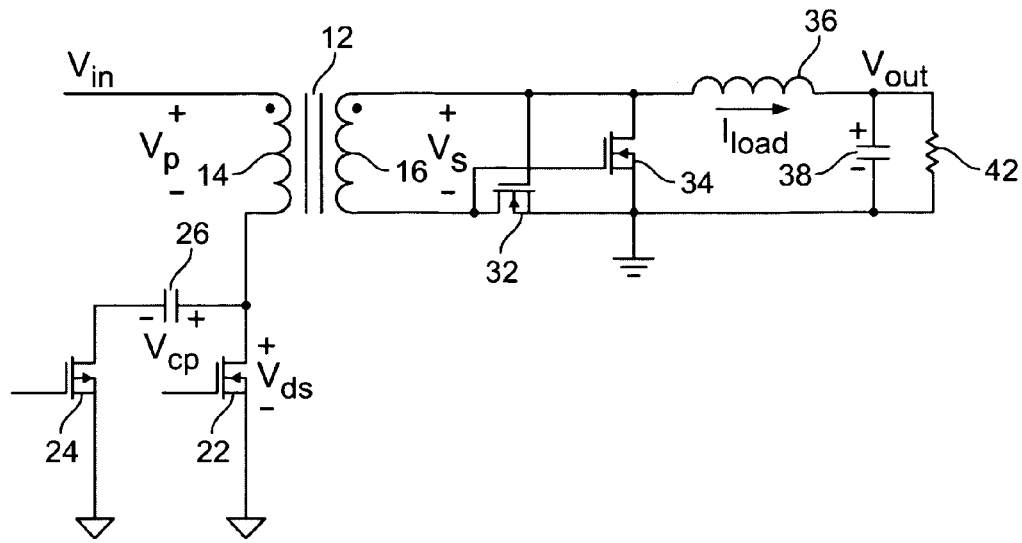
FIG. 1 is a schematic diagram of a prior art isolated forward converter having self-driven synchronous rectification.

Referring first to FIG. 1, a prior art isolated, self-driven forward converter is shown. The forward converter includes a transformer 12 having a primary winding 14 and a secondary winding 16. The dot end of the primary winding 14 is coupled to an input voltage source $V_{IN}$ and the other end of the primary winding is coupled to ground through power switch 22. More particularly, power switch 22 comprises a MOSFET device having drain terminal coupled to the primary winding 14, source terminal coupled to ground, and gate terminal coupled to a pulse width modulator (PWM) (not shown). A second power switch 24 is coupled in parallel with power switch 22 and a reset capacitor 26 is connected between the drain terminals of power switches 22, 24. The PWM provides periodic activation signals to the power switch 22 to regulate the power delivered to the primary winding 14 of the transformer 12. During off states of the power switch 22, the reset capacitor 26 is charged as current is dumped from the primary winding 14, thereby resetting the transformer 12 for the next cycle. Second power switch 24 is then activated to discharge the reset capacitor 26.

The secondary side of the forward converter includes a forward synchronous rectifier 32 connected in series with the secondary winding 16 and a free-wheeling synchronous rectifier 34 connected in shunt with the secondary winding. An output inductor 36 is coupled in series with the secondary winding 16. The output inductor 36 is further coupled to an output terminal, with a capacitor 38 coupled between the output terminal and ground. The output inductor 36 and capacitor 38 define a filter that provides a smoothed DC output voltage $V_{OUT}$ at the output terminal relative to ground. During operation, a load 42 is coupled to the output terminal. The gate terminal of forward synchronous rectifier 32 is coupled to the dot end of the secondary winding 16 and the gate terminal of free-wheeling synchronous rectifier 34 is coupled to the other end of the secondary winding 16.

When power switch 22 is turned on, the dot ends of the primary and secondary windings 14, 16 go positive with respect to the non-dot ends. Current and power flows into the dot end of the primary winding 14. Forward synchronous rectifier 32 is turned on and current and power flow out of the dot end of the secondary winding 16 and into the output inductor 36. Current in the output inductor 36 flows through the load 42, partly through the capacitor 38, and back into the secondary winding 16 through forward synchronous rectifier 32. Conversely, when power switch 22 is turned off, current stored in the magnetizing inductance of transformer 12 is dumped into the reset capacitor 26, which reverses the polarity of the voltage across primary winding 14. This causes the dot ends of primary and secondary windings 14, 16 to go negative with respect to the non-dot ends, causing the forward synchronous rectifier 32 to be shut off and the free-wheeling synchronous rectifier 34 to be turned on. Current in the output inductor 36 continues to flow in the same direction through the load 42, partly through the capacitor 38, and up through the free-wheeling synchronous rectifier 34 back into the output inductor 36. The process then repeats.

As discussed above, a drawback of this strategy for driving the rectifiers 32, 34 is that the voltage imposed on the gate terminals of the MOSFET devices is not controlled and may damage the devices.

Figure 2:
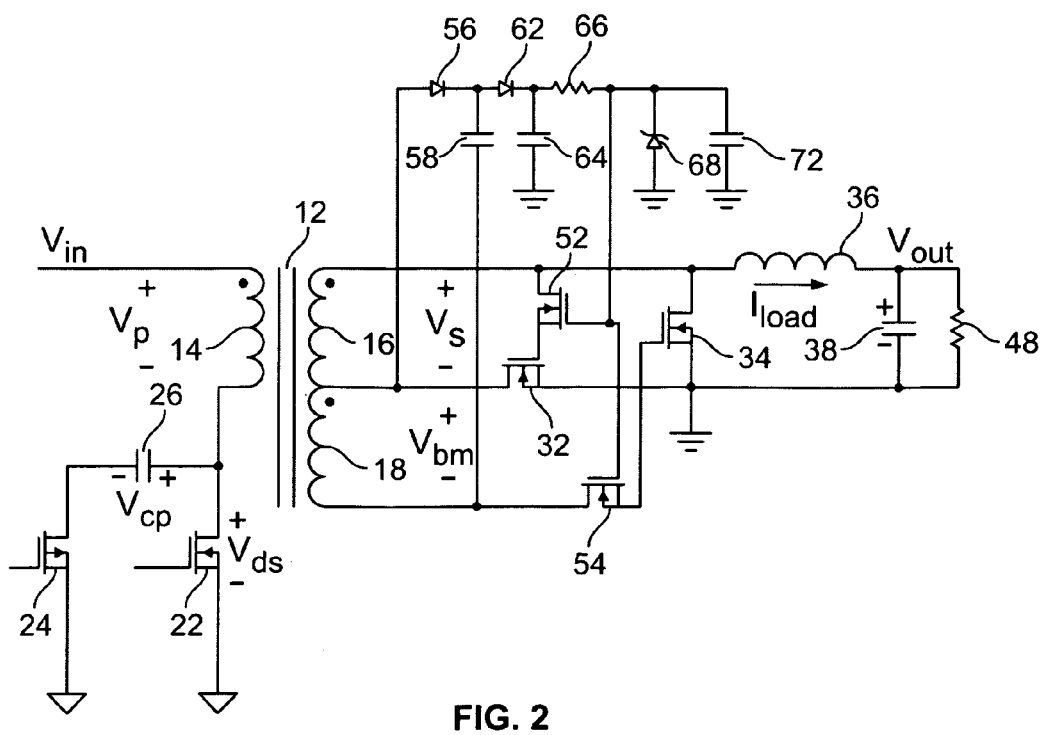
FIG. 2 is a schematic diagram of an isolated forward converter having self-driven synchronous rectification and bias circuitry in accordance with an embodiment of the invention.

FIG. 2 illustrates an isolated forward converter in accordance with an embodiment of the present invention. The forward converter of FIG. 2 is similar in construction to that of FIG. 1, except it includes a secondary side bias/driving circuit that includes diodes 56, 62, 68, capacitors 58, 64, 72, and resistor 66. Transformer 12 further includes an additional secondary bias winding 18. Diodes 56, 62 and resistor 66 are coupled in series with the tap shared by secondary winding 16 and bias winding 18. Capacitor 58 is coupled to the other end of bias winding 18. Forward driving FET 52 is coupled to the gate terminal of forward synchronous rectifier 32, and free-wheeling driving FET 54 is coupled to the gate terminal of free-wheeling synchronous rectifier 34. The gate terminals of driving FETs 52, 54 are coupled together and to the bias/driving circuit.

Figure 3:
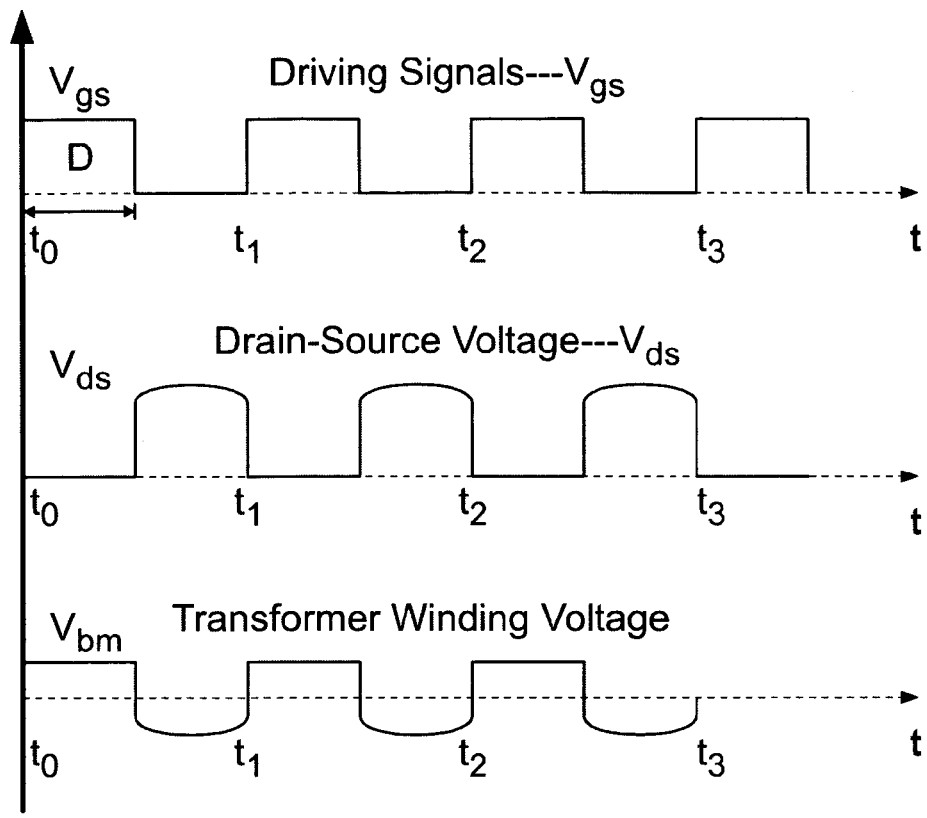
FIG. 3 illustrates various selected waveforms reflecting operation of the isolated forward converter.

As illustrated in FIG. 3, when the driving signal is applied to the gate terminal of the power switch 22, rectangular bias voltage waveform $V_{BM}$ is present at the bias winding 18 of the transformer 12. The bias voltage waveform $V_{BM}$ and secondary winding voltage waveform $V_S$ are defined by the following equations:

$$V_{BM} = V_{IN} * \frac{N_{BM}}{N_P}$$

$$V_S = V_{IN} * \frac{N_S}{N_P}$$

wherein $N_{BM}$ is the number of turns of the bias winding 18, $N_P$ is the number of turns of the primary winding 14, and $N_S$ is the number of turns of the secondary winding 16. When the power switch 22 is turned off, the voltage of the reset capacitor 26 will be applied to the drain of the power switch 22. The drain-to-source voltage $V_{DS}$ across the power switch 22 is defined by the following equation:

$$V_{DS} = V_{IN} * \frac{1}{1-D}$$

wherein D is the pulse width of the driving signal applied to the gate terminal of the power switch 22. From this equation, the bias voltage waveform $V_{BM}$ and secondary winding voltage waveform $V_S$ can be restated as follows:

$$V_{BM} = -V_{IN} * \frac{1}{1-D} * \frac{N_{BM}}{N_P}$$

$$V_S = -V_{IN} * \frac{1}{1-D} * \frac{N_S}{N_P}$$

Next, the operation of the bias/driving circuit is described with reference to FIGS. 4–9. When power switch 22 is turned on, capacitor 58 is charged via diode 56 up to a voltage equal to $$V_{IN} * \frac{N_S}{N_P}.$$

Figure 4:
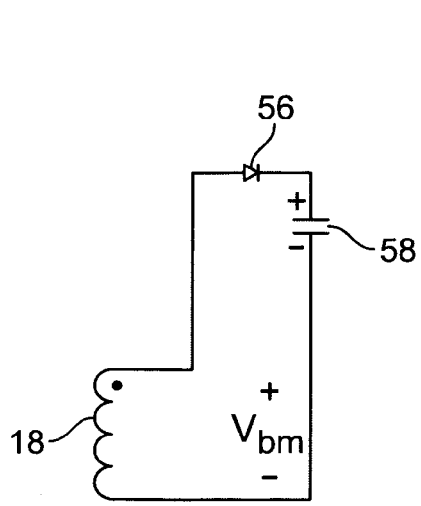
Figure 5:
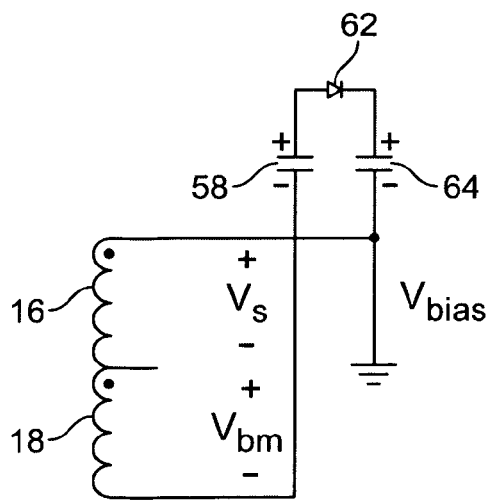
FIG. 5 is a simplified schematic diagram of a charging path of the bias circuitry when the primary side power switch is turned off.

The charging path for capacitor 58 is illustrated in FIG. 4. When power switch 22 is turned off, capacitor 58 dumps its charge through diode 62 to capacitor 64, in accordance with a charging path illustrated in FIG. 5. The bias voltage on capacitor 64 ($V_{BIAS}$) is defined by the following equation:

$$V_{BIAS} = V_{IN} * \frac{D}{1-D} * \frac{N_{BM} + N_S}{N_P} + V_{IN} * \frac{N_{BM}}{N_P}$$

The foregoing equation shows that the bias voltage is not only the peak charging voltage $$V_{IN} * \frac{N_{BM}}{N_P},$$

but includes the additional component $$V_{IN} * \frac{D}{1-D} * \frac{N_{BM} + N_S}{N_P}.$$

The reset voltage applied to the primary side winding 14 of the transformer 12 would be reflected to the secondary side through secondary windings 16 and 18 and added to the bias voltage. This means that the bias/driving circuit can generate sufficient biasing voltage without adding extra windings to the transformer 12.

By way of example, a converter may have the following operating parameters: $V_{IN}$=36V to 75V; $V_{OUT}$=3.3V; $N_P$=6; $N_S$=1; and $N_{BM}$=1. Without the present bias/driving circuit, the biasing voltage for activating the free-wheeling synchronous rectifier 34 would be 6V, which is not enough to permit full functionality of the secondary side control circuitry. In contrast, by utilizing the present bias/driving circuit, the biasing voltage would be 20V at the low line condition. Accordingly, the present bias/driving circuit simplifies the structure of the transformer 12, which in turn shrinks the physical profile of the transformer as well as improving converter efficiency. As shown in FIG. 2, the secondary side biasing voltage is further regulated via resistor 66 and diode 68 at the maximum voltage of 15V, which is used to clamp the maximum gate driving voltage for synchronous rectifiers 32, 34.

Figure 6:
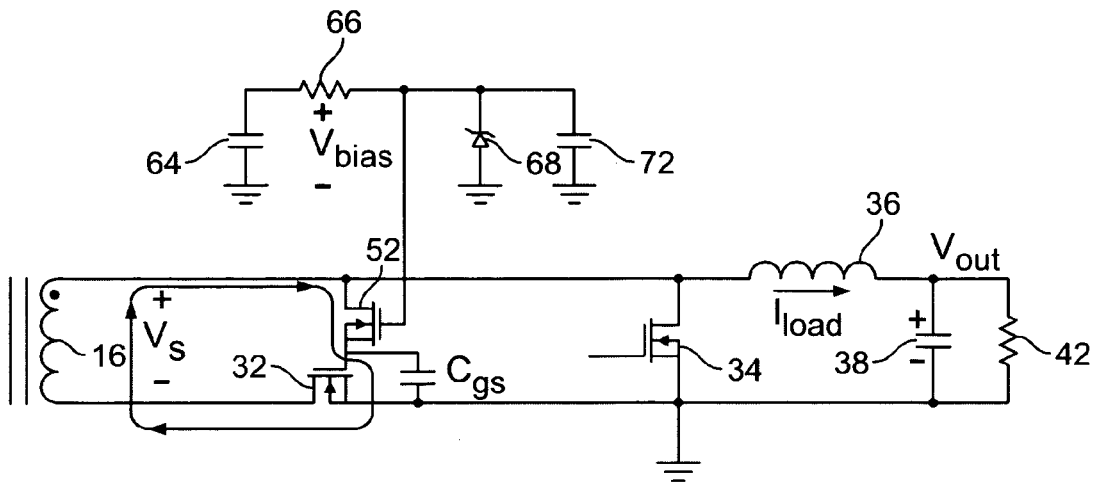
Figure 7:
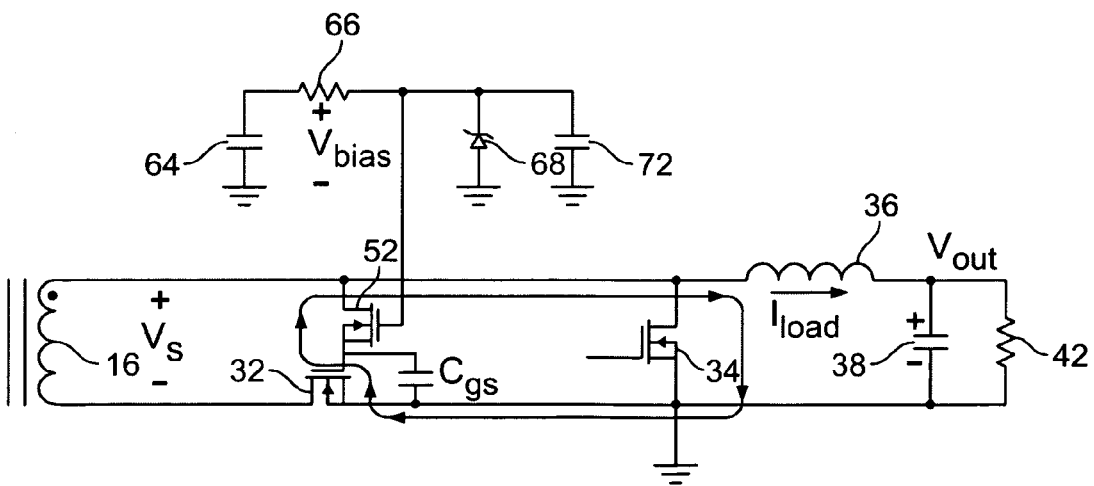
FIG. 7 is a simplified schematic diagram of a driving path of the forward converter when the forward synchronous rectification device is turned off.
Figure 8:
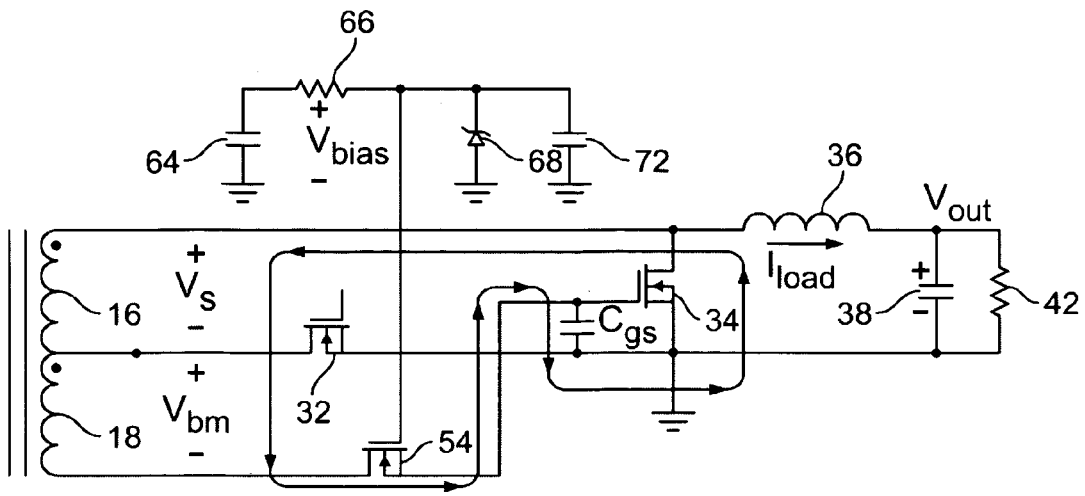
Figure 9:
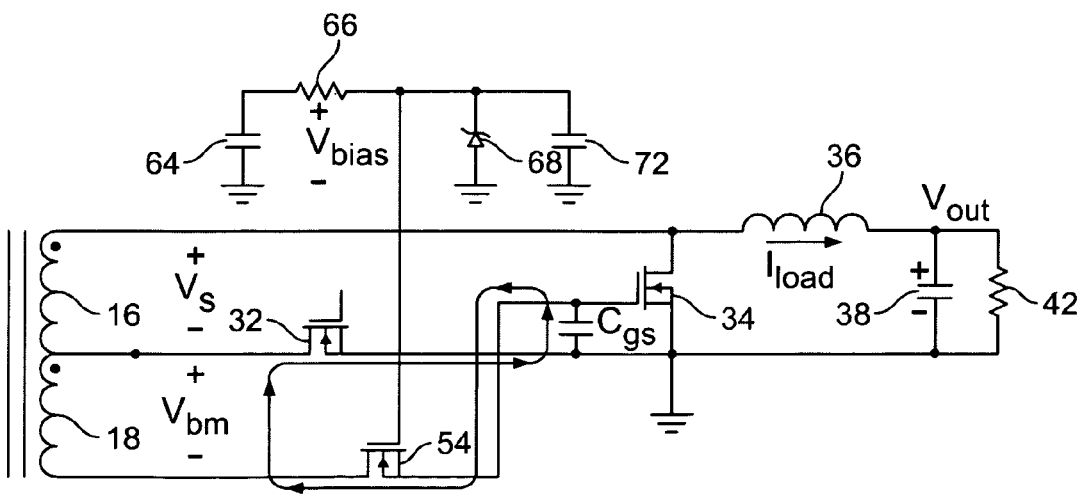
FIG. 9 is a simplified schematic diagram of a driving path of the forward converter when the free-wheeling synchronous rectification device is turned off.

The driving paths for the forward synchronous rectifier 32 turned on and turned off is shown in FIGS. 6 and 7, respectively. Likewise, the driving paths for the free-wheeling synchronous rectifier 34 turned on and turned off is shown in FIGS. 8 and 9, respectively. Forward synchronous rectifier 32 is turned on when secondary voltage $V_S$ is positive (see FIG. 6). With the present bias/driving circuit, even if $V_S$ is 25V, the gate-source voltage of synchronous rectifier 32 will still be clamped at 15V since the gate of driving FET 52 is biased at 15V. When free-wheeling synchronous rectifier 34 turns on, the charge on the gate terminal of synchronous rectifier 32 (reflected by capacitor $C_{GS}$) will be discharged via free-wheeling synchronous rectifier 34, and forward synchronous rectifier 32 turns off. The free-wheeling synchronous rectifier 34 is turned on when the secondary voltage $V_S$ is negative (see FIG. 8). The gate voltage of free-wheeling synchronous rectifier 34 will also be clamped at 15V since the gate of the driving FET 54 is tied to 15V. When $V_{BM}$ turns positive, the charge on the gate terminal of free-wheeling synchronous rectifier 34 (reflected by capacitor $C_{GS}$) will be discharged and the synchronous rectifier 34 turns off.

An advantage of the present bias/driving circuit is that the gate terminals of the synchronous rectifiers 32, 34 is clamped at the bias voltage with few components.

Having thus described a preferred embodiment of a secondary side bias generating and driving circuit for an active-clamped synchronous rectification topology, it should be apparent to those skilled in the art that certain advantages of the described method and apparatus have been achieved. It should also be appreciated that various modifications, adaptations, and alternative embodiments thereof may be made within the scope and spirit of the present invention. The invention is defined solely by the following claims.

What is claimed is:

1. A switched mode power converter, comprising:
   a transformer having a primary winding, a secondary winding, and a bias winding;
   a primary side power switch coupled to said primary winding and being adapted to periodically apply an input voltage to said primary winding;
   an output filter operatively coupled to said secondary winding to provide an output voltage and output current;
   a forward synchronous rectification device operatively coupled in series between said secondary winding and said output filter;
   a free-wheeling synchronous rectification device operatively coupled in shunt with said secondary winding and said output filter; and
   a control circuit coupled to said bias winding and said forward and free-wheeling synchronous rectification devices, said control circuit including a forward driving device adapted to couple an activation terminal of said forward synchronous rectification device to a first end of said secondary winding and a free-wheeling driving device adapted to couple an activation terminal of said free-wheeling synchronous rectification device to a second end of said secondary winding, said control circuit activating said forward and free-wheeling driving devices responsive to voltage on said bias winding.

2. The switched mode power converter of claim 1, wherein said control circuit further comprises a first capacitor charged by said bias voltage during an on-state of said primary side power switch.

3. The switched mode power converter of claim 2, wherein said control circuit further comprises a second capacitor receiving charge from said first capacitor during an off-state of said primary side power switch, voltage on said second capacitor activating said forward and free-wheeling driving devices.

4. The switched mode power converter of claim 3, wherein said control circuit further comprises a clamping circuit adapted to regulate said voltage on said second capacitor.

5. The switched mode power converter of claim 1, further comprising a reset capacitor operatively coupled to said primary winding, said reset capacitor being charged as current is withdrawn from said transformer during an off-state of said primary side power switch.

6. The switched mode power converter of claim 5, wherein voltage on said reset capacitor is reflected in said voltage on said bias winding.

7. In a switched mode power converter comprising a transformer having a primary winding, a secondary winding, and a bias winding, a primary side power switch coupled to said primary winding and being adapted to periodically apply an input voltage to said primary winding, an output filter operatively coupled to said secondary winding to provide an output voltage and output current, a forward synchronous rectification device operatively coupled in series between said secondary winding and said output filter, and a free-wheeling synchronous rectification device operatively coupled in shunt with said secondary winding and said output filter, a control circuit comprises:
    a forward driving device adapted to couple an activation terminal of said forward synchronous rectification device to a first end of said secondary winding;
    a free-wheeling driving device adapted to couple an activation terminal of said free-wheeling synchronous rectification device to a second end of said secondary winding; and
    a bias charge circuit adapted to provide a bias voltage to activate said forward and free-wheeling driving devices responsive to voltage on said bias winding.

8. The control circuit of claim 7, wherein said bias charge circuit further comprises a first capacitor charged by said bias voltage during an on-state of said primary side power switch.

9. The control circuit of claim 8, wherein said bias charge circuit further comprises a second capacitor receiving charge from said first capacitor during an off-state of said primary side power switch, voltage on said second capacitor activating said forward and free-wheeling driving devices.

10. The control circuit of claim 9, wherein said bias charge circuit further comprises a clamping circuit adapted to regulate said voltage on said second capacitor.

11. A switched mode power converter, comprising:
    a transformer having a primary winding, a secondary winding, and a bias winding;
    a primary side power switch coupled to said primary winding and being adapted to periodically apply an input voltage to said primary winding;
    an output filter operatively coupled to said secondary winding to provide an output voltage and output current;
    a forward synchronous rectification device operatively coupled in series between said secondary winding and said output filter;
    a free-wheeling synchronous rectification device operatively coupled in shunt with said secondary winding and said output filter;
    a forward driving device adapted to couple an activation terminal of said forward synchronous rectification device to a first end of said secondary winding;
    a free-wheeling driving device adapted to couple an activation terminal of said free-wheeling synchronous rectification device to a second end of said secondary winding; and
    means for activating said forward and free-wheeling driving devices responsive to voltage on said bias winding.

12. The switched mode power converter of claim 11, wherein said activating means further comprises a first capacitor charged by said bias voltage during an on-state of said primary side power switch.

13. The switched mode power converter of claim 12, wherein said activating means further comprises a second capacitor receiving charge from said first capacitor during an off-state of said primary side power switch, voltage on said second capacitor activating said forward and free-wheeling driving devices.

14. The switched mode power converter of claim 13, wherein said activating means further comprises a clamping circuit adapted to regulate said voltage on said second capacitor.

15. The switched mode power converter of claim 11, further comprising a reset capacitor operatively coupled to said primary winding, said reset capacitor being charged as current is withdrawn from said transformer during an off-state of said primary side power switch.

16. The switched mode power converter of claim 15, wherein voltage on said reset capacitor is reflected in said voltage on said bias winding.

* * * * *